Sept. 16, 1924.                                              1,508,447
C. S. FORBES
PHOTOGRAPHIC FILM PACKAGE
Filed May 5, 1923
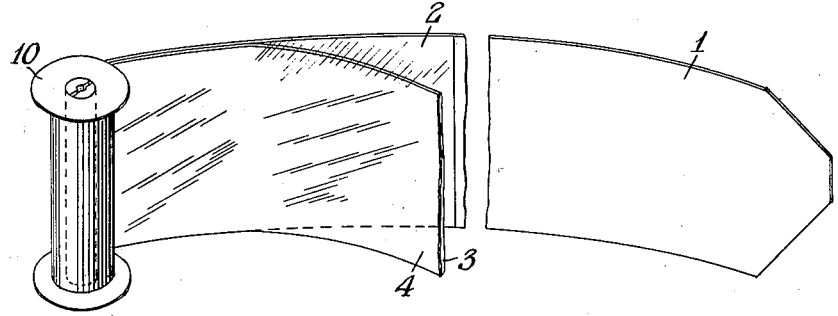
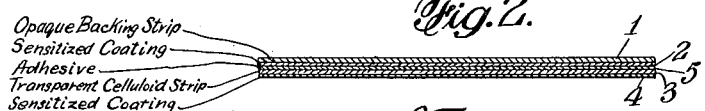
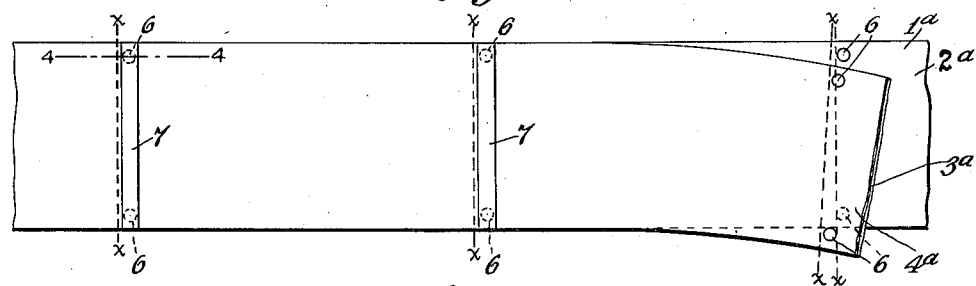
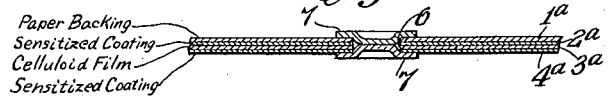
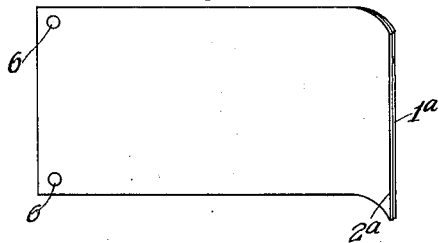   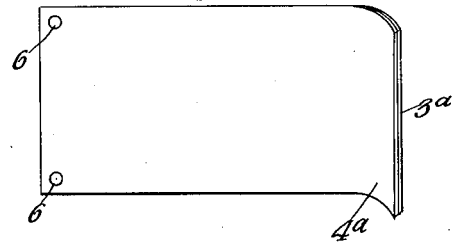
Inventor
Charles Stewart Forbes
By his Attorney
Louis Prevost Whitaker.

Patented Sept. 16, 1924.

1,508,447

UNITED STATES PATENT OFFICE.

CHARLES STEWART FORBES, OF STRATHDON, SCOTLAND.

PHOTOGRAPHIC-FILM PACKAGE.

Application filed May 5, 1923. Serial No. 637,011.

*To all whom it may concern:*

Be it known that I, CHARLES STEWART FORBES, a subject of the King of Great Britain, residing at Castle Newe, Strathdon, in the county of Aberdeen, Scotland, have invented certain new and useful Improvements in Photographic-Film Packages; and I do hereby declare the following to be a full, clear, and exact description of the invention, such as will enable others skilled in the art to which it appertains to make and use the same.

My invention consists in the novel features hereinafter described reference being had to the accompanying drawing which illustrates two embodiments in which I have contemplated embodying the invention, selected by me for purposes of illustration, and the said invention is fully disclosed in the following description and claims.

The object of my invention is to provide as a new article of manufacture, a film package, roll or cartridge, suitable for use in ordinary cameras, which can be manufactured at substantially the same price as the ordinary film rolls now in use, but which can be used, at the option of the purchaser, either for the making of ordinary photographic negatives from which one color prints are to be made, or for the production of colored photographs when desired. Thus, for example, the photographer, whether professional or amateur, using a camera which is equipped with my improved film roll or cartridge, is able to take ordinary photographs whenever desired, and should occasion arise, as may often be the case, that a scene rich in color presents itself to his view, the film package or cartridge may be used for the production of a color print therefrom without disturbing the cartridge or roll, by simply applying a ray filter of ordinary construction to the lens. It will be understood that any one or all of the exposures provided by the film may be made for ordinary one color print photography or for color print photography as preferred.

Referring to the accompanying drawings, Fig. 1 is a perspective view of a film package roll or cartridge embodying my invention, in which the two films and their supports are united with an adhesive material, and showing one end of the backing strip drawn from the roll and a portion of the celluloid film at one end of the same separated from the backing strip and drawn forward for greater clearness of illustration.

Fig. 2 is a sectional view of a portion of the combined strip, somewhat exaggerated and showing the film supports with their sensitized coatings united by adhesive material.

Fig. 3 is a perspective view of a slightly modified form of combined film strip showing the two film supports and their coatings provided with registering apertures and united adhesively by transverse strips of paper, adhesively connected through the registering apertures, a portion of the celluloid film and its coatings being drawn forward in the illustration, for greater clearness.

Fig. 4 represents a section on line 4—4 of Fig. 3, through one side of the registering apertures.

Fig. 5 represents a section of the backing strip with its coating, after being severed from the main strip, one end being curved forwardly in order to illustrate the film support or backing and its emulsion coating.

Fig. 6 is a similar view showing one section or negative of the celluloid strip, the end of which is also bent forward in order to illustrate the celluloid backing and emulsion coating.

The ordinary film cartridge comprises a spool upon which is wound a backing strip of paper or other material through which light will not penetrate, and the longitudinal edges of which are fitted to the flanges of the spool, and a transparent film of celluloid carrying a surface coating of sensitized gelatine or other sensitized coating is attached to the backing strip and wound up on the spool therewith, being usually attached at its opposite ends by adhesive to the backing strip.

In carrying out my invention I provide as shown, for example, in Figs. 1 and 2, a sensitized strip composed of transparent celluloid 3 provided on its inner face (by which I mean the face nearer the lens as the film is passed through the camera during exposure) with a coating 4 of sensitized emulsion, treated with a dye or other suitable material in a well known way, so that it will absorb the rays of one primary color (as red for example) and transmit the rays of another primary color (as green for example). I also provide the usual backing 1 of non-transparent paper or other suitable material, which, in accordance with my invention, has its inner face in rear of the celluloid strip, 3, coated with emulsion sensitized and treated with a dye or other suitable material, so that it will absorb the rays of the color transmitted by the main or front film (green for example). The film cartridge is made up in the usual manner by attaching the main or front transparent celluloid film 3—4 to the backing strip 1 in any usual or preferred manner, and rolling it up on a suitable spool indicated at 10. It will be noticed that the only additional expense of preparation of the film lies in the additional emulsion applied to the backing strip and the dye or other material employed, the cost of both of which is merely nominal.

In order that the two films shall be held in parallel planes during exposure so as to avoid the blurring of the image on either of the films, I prefer to temporarily unite the two films. For example, a convenient method of uniting them is to apply to the back of the transparent celluloid film or to the sensitized coating carried on the face of the opaque backing paper, as preferred, a coating 5 of a simple adhesive material, soluble in water, for example, gum arabic, and adhesively uniting the two films throughout their entire extent as indicated in Fig. 2. Another method of uniting the two films as illustrated in Figs. 3 and 4 and consists in providing the two films with registering perforations or holes 6, preferably ⅜ or ⅟₁₆ of an inch in diameter, two or more in number, having their centres disposed in a line extending transversely of the film and located adjacent to each line of division indicated by dotted lines x—x, between adjacent exposures, or pictures, which are to be made on the film, and to apply upon the front of the inner or transparent film 3ª, carrying the sensitized coating 4ª, and on the back of the opaque paper backing 1ª carrying the second sensitized coating, 2ª, transverse strips of paper 7 coated with a simple adhesive, soluble in water, such as gum arabic, the adhesive strips being secured to the inner face of the transparent film and the outer face of the opaque backing strip, and being adhesively secured to each other through the holes or apertures in the two films as clearly shown in Fig. 4. This holds the two films firmly together adjacent to transverse lines corresponding with the lines of division between separate exposures or pictures. Previous to development the films can be immersed in water for the purpose of separating them by dissolving the gum arabic, so as to permit them to be separately developed and treated, as hereinafter described, or if one color pictures alone are desired, the backing strip and its film can be discarded altogether. While I prefer to temporarily unite the two films, this is not absolutely essential, as the tension to which the films are subjected in passing them through the camera, tends to hold them in parallelism. The positive connection of the two films will, however, positively insure the parallelism of the films at the time of exposure, and where the films are provided with registering apertures, adjacent to transverse lines between separate exposures, these registering apertures in the films will be found of great convenience, where colored photographs are to be made in securing the proper registration of the negatives and prints, as hereinafter described, and as indicated in Figs. 5 and 6.

My improved film can be inserted in a camera in the ordinary manner, and if ordinary negatives for one color prints are desired, the film will be exposed in the same manner exactly as the ordinary commercial film now in use. It will be understood that the two sensitized films are entirely separate and distinct from each other and that at each exposure there will be two images recorded, one on the main film and one immediately back of it on the film carried by the backing strip. Where ordinary one color prints are desired, the exposure is made in the ordinary manner and the second image, to wit, that made on the film carried by the opaque backing strip, is discarded. Whenever the operator desires to record a scene by color photography, however, it is only necessary to apply to the lens of the camera, a color screen of well known construction which will filter out the rays of the third primary color, and the so-called chemical rays, thus eliminating, in the example supposed, the blue, violet and chemical rays. With the filter applied, when the light strikes upon the exposed portion of the films, the rays of one primary color, as red, will be absorbed by the main film or front film, while the rays of the other primary color, as green, will be transmitted through the front film to the film carried by the backing sheet, or rear film. When these films so exposed in connection with the ray filter are developed, the operator will have two records of the photographed image, in perfect register, from which a print in two primary colors, as green and red for example, may be made, one over the other in any one of a number of ways in which this result can be produced. For example, from the front film, assuming that it was so exposed as to absorb the red rays and transmit the green rays, and it is desired to produce a green print, a bromide print may be made from it and toned with vanadium toning bath to obtain the desired green color. The rear film on the paper backing may, for example, be treated with a material which will render it more or less absorbent according to the amount of silver present in various portions of the film. For example, a treatment with vanadium will produce this result, after which it may be placed in a bath containing an aqueous preparation of a red color, which will be absorbed therein inversely in accordance with the amount of silver in the image, the green bromide print after rinsing may now be laid in registration with negative which has absorbed the red color and subjected to pressure which will have the effect of printing the image produced on the rear film, in red, over upon the green print from the front film, thereby giving a colored photograph in accurate reproduction of the colors of the scene photographed.

Any desired means may be employed to secure accurate registration in printing the second color upon the print prepared in the first color. As before stated, where the films have been connected by transverse strips of adhesive paper connected to the films and to each other through registerig apertures in the films and film supports, the registering apertures themselves will provide a convenient means for securing registration in printing the second color upon the previously prepared print in the first color.

I do not desire to be limited to any exact details in regard to the method or methods to be employed in the preparation of the colored prints, from the two developed film sections, as any desired methods may be employed.

What I claim and desire to secure by Letters Patent is:—

1. As a new article of manufacture, a photographic film package comprising a non-transparent backing strip provided with a sensitized coating, and a transparent sheet in front of said coating, provided with a sensitized coating.

2. As a new article of manufacture, a photographic film package comprising a non-transparent backing strip provided with a sensitized coating, and a transparent sheet in front of said coating, provided with a sensitized coating which will absorb the rays of light of a primary color and transmit the rays of a complementary color.

3. As a new article of manufacture, a photographic film package comprising a main film consisting of a transparent material carrying a coating sensitized so as to absorb the rays of a primary color and transmit the rays of a complementary color, and a backing of non-transparent material in rear of said main film, and having on its front face a coating sensitized to absorb the rays of the color transmitted by the main film.

4. As a new article of manufacture, a film roll or cartridge comprising a spool, a main film consisting of a celluloid strip coated on its inner face with an emulsion sensitized so as to absorb the rays of one primary color and transmit the rays of a complementary color, and a non-transparent paper backing strip having its inner face coated with a film of emulsion sensitized so as to absorb the rays of the color transmitted by the main film, the main film and the backing strip being united and wound upon said spool.

5. As a new article of manufacture, a photographic film package comprising a non-transparent packing provided with a sensitized coating and a transparent sheet in front of said coated backing provided with a sensitized coating, said backing strip and transparent sheet being temporarily united so as to be held in parallelism during exposure.

6. As a new article of manufacture, a photographic film package comprising a main film consisting of a transparent material provided with a coating sensitized so as to absorb the rays of a primary color and transmit the rays of a complementary color, and a backing of non-transparent material in rear of said main film and having on its face a coating sensitized so as to absorb the rays of the color transmitted by the main film, said films being temporarily united by means of adhesive material, soluble in water, for the purpose of holding them in parallelism during exposure.

7. As a new article of manufacture, a photographic film package comprising a main film consisting of a transparent material provided with a coating sensitized so as to absorb the rays of a primary color and transmit the rays of a complementary color, and a backing of non-transparent material in rear of said main film and having on its face a coating sensitized so as to absorb the rays of the color transmitted by the main film, said films being provided with registering apertures adjacent to lines of division between exposures and provided with transversely disposed securing strips united through said registering apertures, by an adhesive material, soluble in water.

8. As a new article of manufacture, a photographic film package comprising a main film consisting of a transparent material provided with a coating sensitized so as to absorb the rays of a primary color and transmit the rays of a complementary color, and a backing of non-transparent material in rear of said main film and having on its face a coating sensitized so as to absorb the rays of the color transmitted by the main film, said films being provided with registering apertures, adjacent to lines of division between separate exposures.

9. As a new article of manufacture, a photographic film package comprising a main film consisting of a transparent material provided with a coating sensitized so as to absorb the rays of a primary color and transmit the rays of a complementary color, and a backing of non-transparent material in rear of said main film, and having on its face a coating sensitized so as to absorb the rays of the color transmitted by the main film, said films being provided with registering apertures adjacent to lines of division between separate exposures, and being temporarily united by means of adhesive material, soluble in water.

In testimony whereof I affix my signature.

Sir CHARLES STEWART FORBES, Bart.